United States Patent
Magaraggia

[11] Patent Number: 5,571,422
[45] Date of Patent: Nov. 5, 1996

[54] METHOD FOR REMOVING IMPURITIES FROM A LIQUID

[75] Inventor: Flavio Magaraggia, Vicenza, Italy

[73] Assignee: Comer S.p.A., Vicenza, Italy

[21] Appl. No.: 489,995

[22] Filed: Jun. 12, 1995

Related U.S. Application Data

[62] Division of Ser. No. 267,277, Jun. 28, 1994, Pat. No. 5,454,935.

[30] Foreign Application Priority Data

Jul. 5, 1993 [IT] Italy .................. MI93A1455

[51] Int. Cl.$^6$ ..................... C02F 1/24
[52] U.S. Cl. .......... 210/703; 210/712; 210/738; 210/805; 210/221.2; 209/164; 209/169; 209/170; 162/4
[58] Field of Search ..................... 210/703, 219, 210/221.2, 712, 738, 805, 197, 221.1; 209/164, 169, 170; 162/4

[56] References Cited

U.S. PATENT DOCUMENTS

| | | |
|---|---|---|
| 838,626 | 12/1906 | Kirby . |
| 2,064,398 | 12/1936 | Zeigler . |
| 3,298,519 | 1/1967 | Hollingsworth . |
| 4,094,783 | 6/1978 | Jackson . |
| 4,161,444 | 7/1979 | Moore . |
| 4,186,094 | 1/1980 | Heilberg . |
| 4,347,128 | 8/1982 | Barnscheidt . |
| 4,750,994 | 6/1988 | Schneider . |
| 5,096,572 | 3/1992 | Hwang . |

FOREIGN PATENT DOCUMENTS

| | | |
|---|---|---|
| 0037513 | of 1981 | European Pat. Off. . |
| 3524071 | of 1987 | Germany . |
| 52-25461 | 2/1977 | Japan . |
| 4-166280 | 6/1992 | Japan . |
| 520132 | 8/1976 | U.S.S.R. . |

*Primary Examiner*—Thomas M. Lithgow
*Attorney, Agent, or Firm*—Dann, Dorfman, Herrell and Skillman; Henry H. Skillman

[57] ABSTRACT

The present invention concerns a reactor for removing impurities from a liquid, in particular for de-inking, including a tank (1) within which the liquid to be purified together with a gas or air is introduced (2–3); a drain of the purified accepted through an outlet (7) of said tank (1); inlets (8–11, 9–12, 10–13) at different heights of the tank (1) connected to said purified liquid outlet (7) together with the inlet of gas or air; a rotating shaft (18) inside the tank (1) carrying blades (20, 21, 22, 23) at the different heights of the tank within which the liquid together with gas or air is introduced; the blades (20, 21, 22, 23) have progressively increasing heights when moving towards the lower portion of the tank (1). The invention also concerns the method embodied by the above-described reactor.

7 Claims, 1 Drawing Sheet

METHOD FOR REMOVING IMPURITIES FROM A LIQUID

This is a division, of application Ser. No. 08/267,277, filed Jun. 28, 1994 now U.S. Pat. No. 5,957,735.

The present invention concerns a reactor for removing impurities from a liquid, in particular for de-inking suspensions deriving from printed waste paper.

Apparatuses are known for removing impurities from liquids and in particular for de-inking paper suspensions, said apparatuses being based on the flotation method.

For example, U.S. Pat. No. 4.186.094 concerns an apparatus for eliminating impurities from a liquid by means of flotation, including various flotation cells arranged one on top of the other. The liquid-air mixture is introduced in the lower portion of the lowermost cell, with the subsequent separation of the air bubbles enclosing the impurities of the purified liquid which is taken to the uppermost cell. The separation of the bubbles from the purified liquid takes place in this last cell, in which also air is introduced in addition to the purified liquid, which passes down into the underlying cell and so on for the cells arranged below. In this way, the bubbles loaded with impurities flow downwards from each cell through a drain, while the accepted flows out from each single cell for the use thereof.

This purification system, besides being complicated and expensive, has a low purification efficiency mainly due to the fact that the apparatus is made up of various cells arranged in series one with respect to the other.

The main object of the present invention was to provide an apparatus according to a method such as to improve the purification efficiency, with an increase, in the case of paper mixtures de-inking, in the pulp density and the cleaning of the light polluting portions.

These and other objects are achieved by the present reactor having the main feature of consisting in a single cell in whose upper portion the liquid-air mixture is introduced, the purified liquid flowing out from the cell bottom, a portion of the liquid being directed to the use thereof as accepted while a portion thereof is continuously introduced at different levels or washing beds of the cell. Further, a rotating shaft is arranged inside the cell and carries blades shaped so as to stir the liquid and take it inwards to achieve a better washing of the liquid by means of the air in the various washing beds, at which the purified liquid coming from the cell bottom is introduced mixed with air sucked in at the various liquid inlet levels.

Further characteristics and advantages of the invention will be apparent from the following detailed description of a preferred but not exclusive embodiment thereof, illustrated merely as a non-limiting example in the annexed figures wherein.

Figure 1:
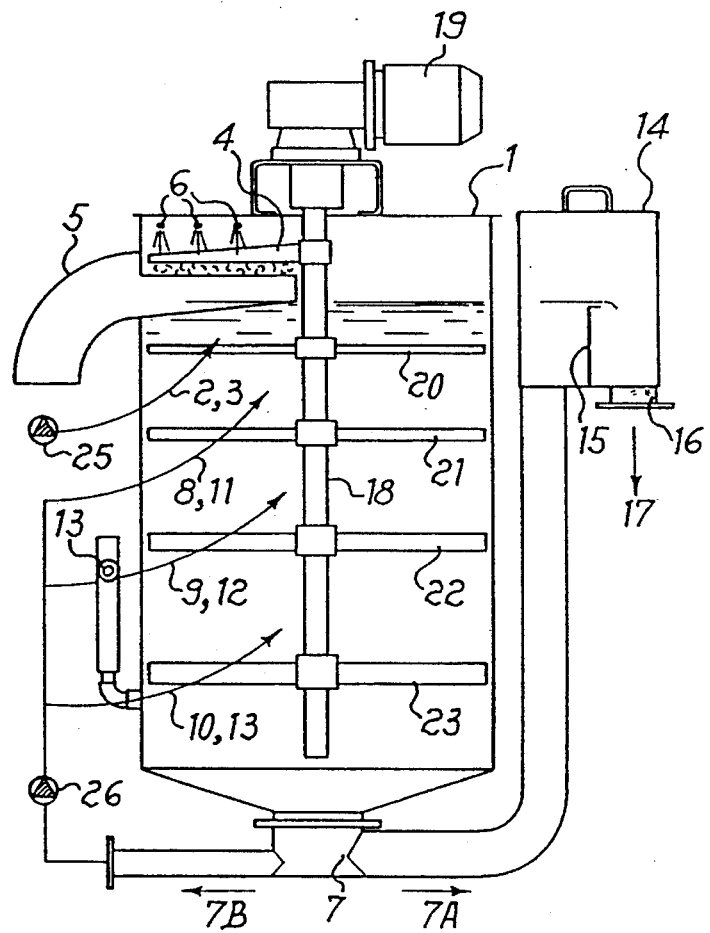
FIG. 1 is a schematic sectional view of the present reactor.

Referring to the figures, the present reactor includes a tank 1 within which, in the upper portion thereof, there is located the main inlet 2 of the liquid to be purified which is introduced mixed with a gas or air sucked in through duct 3 inserted into the inlet duct 2. The foam formed by bubbles enclosing the impurities, e.g. ink contained in the liquid introduced in the reactor, is removed by the rotating skimming blade 4 which directs said foam through the outlet duct 5. The skimming blade 4 is cleaned by water jets 6 located above the blade.

In the meanwhile, the purified liquid flows down through the outlet 7 located at the center of the lower portion of tank 1.

Figure 3:
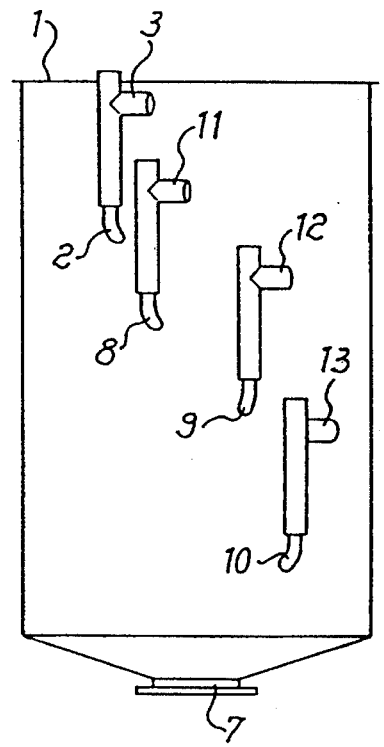
FIG. 3 is an outer side view of the reactor of FIG. 1.
Figure 2:
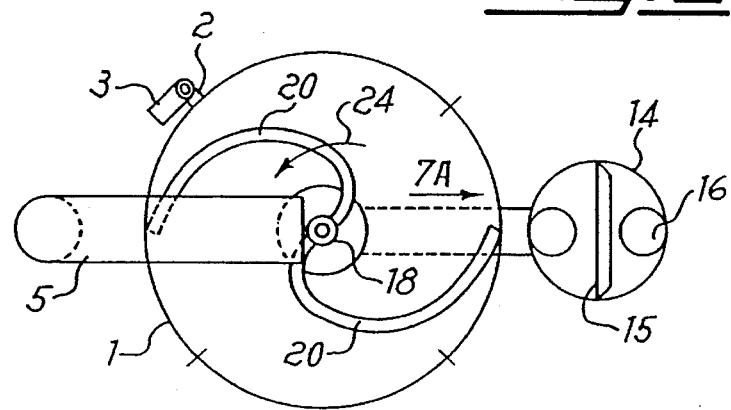
FIG. 2 is a schematic horizontal cross section of FIG. 1.

According to the main feature of the present invention, said tank 1 has inlets 8, 9, 10 at different heights, as it can be seen in fig.3, within which simultaneously flows the purified liquid discharged through outlet 7. Gas or air is sucked in through ducts 11, 12 and 13, respectively inserted into the liquid inlet ducts 8, 9 and 10.

A portion of the purified liquid flowing out through outlet 7 is directed upwards according to arrow 7A towards container 14, provided with an internal wall 15, along which the purified liquid flows out through drain 16 according to arrow 17.

Said tank 1 includes therein a rotating shaft 18 connected to motor for its rotation. Said shaft 18 is provided with blades 20, 21, 22, 23 positioned at the different tank heights forming the washing beds, within which the liquid together with air or gas is introduced, as described above.

Said blades increase in height when moving downwards, and have the function of breaking up the gas-liquid-fiber phase, in the case of paper mixtures, while their different height is due to the fact that the speed of the downflowing liquid increases when moving downwards, i.e. towards the bottom of tank 1. A further characteristic is that said blades are spiral-curved with the concavity facing the direction of the rotating motion of said shaft 18, i.e. according to arrow 24. Moreover, the blade rotation speed can be changed by means of a speed variator, in order to achieve a control of the chemical-physical reactions inside the reactor.

As it is schematically shown in FIG. 1, The main inlet 2 of the liquid mixed with the gas or air is controlled by valve 25, while the inlets 8–11, 9–12, 10–13 of the purified liquid mixed with gas or air are controlled by valve 26.

In brief, the operation of the above-described reactor and consequently the method for removing impurities from a liquid embodied by said reactor includes the steps of introducing the liquid mixed with air or gas in the upper portion of tank 1 and further introducing the purified liquid with air or gas simultaneously and continuously at different heights of tank 1 in the various washing beds, said purified liquid coming according to arrow 72 from outlet 7 of tank 1 and letting out a portion of said purified liquid as accepted liquid through drain 16. Furthermore, the stirring of the liquid by means of blades 20, 21, 22, 23 increases when moving down from the upper portion to the lower portion of tank 1, according to the different blade height, as described above, and the liquid is simultaneously pushed towards the central area of tank 1 by the particular spiral shape of blades 20, 21, 22, 23 in order to carry out the washing of the liquid with air on each horizontal section of the tank.

I claim:

1. A method for removing impurities from a liquid including the steps of:

providing a tank having an upper and lower portion, a main inlet in the upper portion, an outlet located in the lower portion of said tank;

introducing gas or air together with the liquid to be purified through said main inlet;

providing inlets at different heights in the tank;

introducing into said inlets purified liquid drained off from said outlet together with gas or air; and providing in the tank, mechanical rotating stirring element suitable to stir the liquid, wherein said mechanical rotating stirring element is at said different heights of the tank where the liquid together with gas or air is introduced through said inlets.

2. A method according to claim 1 including the step of providing said mechanical rotating stirring elements with a rotating shaft having blades spiral-curved with the concavity facing the direction of the rotating motion of said shaft.

3. Method according to claim 2 including the step of varying the rotation speed of said shaft.

4. A method according to claim 2 including the step of providing said blades with progressively increasing heights when moving from the upper portion towards the lower portion of the tank.

5. A method for removing impurities from a liquid including the steps of:

providing a tank having an upper and a lower portion, a main inlet in the upper portion, an outlet located in the lower portion of said tank;

introducing gas or air together with the liquid to be purified through said main inlet;

providing inlets at different heights in the tank;

introducing into said inlets purified liquid draining off from said outlet and gas or air for introducing purified liquid together with gas or air into said tank; and providing a rotating shaft provided with blades in the tank suitable to stir the liquid, said blades being spiral-curved with the concavity facing the direction of the rotating motion of said shaft.

6. A method according to claim 1 wherein said impurity is ink in a deinking process.

7. A method according to claim 5 wherein said impurity is ink in a deinking process.

* * * * *